W. TROELLER.
PROCESS OF TREATING ORES AND METALLURGICAL PRODUCTS.
APPLICATION FILED JUNE 25, 1910.
1,068,611.
Patented July 29, 1913.
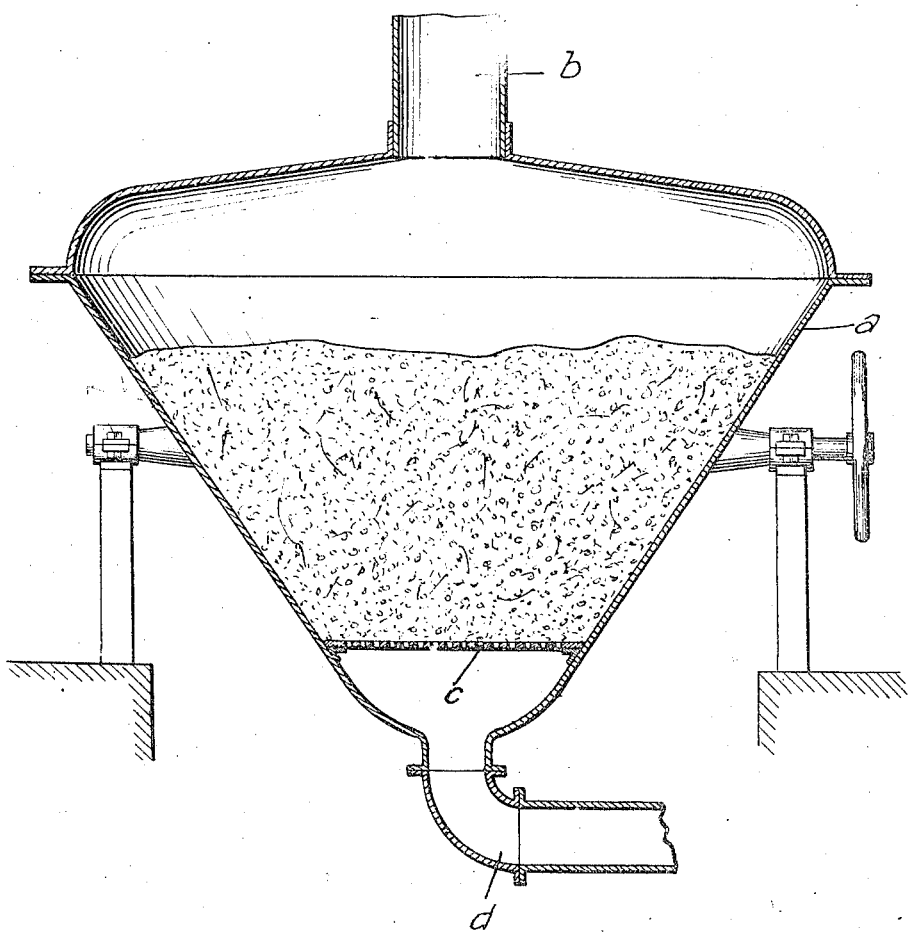
WITNESSES:
INVENTOR
Wilhelm Troeller
BY
ATTORNEYS

UNITED STATES PATENT OFFICE.

WILHELM TROELLER, OF FRANKFORT-ON-THE-MAIN, GERMANY.

PROCESS OF TREATING ORES AND METALLURGICAL PRODUCTS.

1,068,611.  Specification of Letters Patent.  Patented July 29, 1913.

Application filed June 25, 1910. Serial No. 568,885.

*To all whom it may concern:*

Be it known that I, WILHELM TROELLER, citizen of Germany, resident of 7 Böhmerstrasse, Frankfort-on-the-Main, Germany, metallurgical engineer, have invented a new and useful Improvement in Processes of Treating Ores and Metallurgical Products, of which the following is a specification.

The present invention relates to a process for treating ores and metallurgical products containing volatile metals and metalloids, especially zinc, lead, arsenic, antimony, quicksilver, tin, with a view to recovering these metals and metalloids and separating them from one another.

According to a well-known process such ores and metallurgical products are treated by mixing them with fine coal (unless such is already present in the material), then feeding the mixture to an appropriate furnace (such as a converter furnace) and after having ignited the mass, forcing a current of air under pressure from below upward through the charge. Owing to the effects of the combustion, reduction and oxidation thus taking place, the volatile metals and metalloids are carried away as such or in the form of oxids, together with the current of combustion gases escaping from the charge, and may be precipitated in suitable condensers. A first drawback to this known process is that the pressure of the air conducted through the charge must be relatively low, otherwise the charge would be thrown out of the furnace along with the current of gases. Another inconvenience consists in that the volatilization of the metals in the charge does not proceed in a uniform manner, the air being distributed irregularly over the section of the furnace, and consequently the combustion is irregular and substantial differences of temperature exist in the charge. Owing to this condition, sufficient volatilization of the metals will take place only in some places of the charge, while in the bulk of the charge the removal of the metals and metalloids is very imperfect, so that as a result of the operation the total recovery of volatile metals is relatively low. Moreover it is not possible in this known process to recover separately several metals and metalloids present in the material under treatment, though, as is well known, the temperature of volatilization of all these metals is different. In order to realize such separation of metals and metalloids which volatilize at different temperatures, it is necessary to raise gradually and in a uniform way the temperature of the whole mass of the charge. With the known process such uniform increase of the temperature prevailing in the charge cannot be obtained on account of the irregular distribution of the current of air through the mass of the charge in consequence of the formation of air channels and more or less important hollow spaces.

The primary object of the present invention is to improve the above described known process so as to remove these objections.

The invention consists in forcing the current of air downwardly from the top to the bottom through the ignited charge, which is present, in a comparatively thick layer, in a converter or like furnace, preferably tapered toward the bottom, the pressure of the air current being comparatively high.

In the accompanying drawing illustrating a converter furnace suitable for carrying out the process disclosed in this invention, $a$ is a converter furnace, $b$ is the inlet for air supply, $c$ is the furnace grate and $d$ is the outlet for the volatilized metals and metalloids and for the products of combustion.

In carrying out the present invention, the mixture of ore and coal having been fed in a sufficiently thick layer to a suitable furnace (for instance to a converter) the charge is then ignited at its surface and air blown in downwardly from the top through the charge. Combustion gradually progresses toward the bottom of the charge. The furnace being tapered toward the bottom, the air current first comes into contact with a large mass of the charge so that the greater part of its oxygen is soon consumed. Thus by the time the gases reach the lower part of the charge, they contain principally carbonic oxid and nitrogen, and very little, if any, oxygen, so that in the first stage of the operation no combustion of coal can take place in the lower part of the charge, which becomes, however, preheated to a high temperature by the escaping products of combustion. Owing to the intense combustion of the fuel in the upper part of the charge, the temperature at which the metals and metalloids volatilize is soon reached and the volatilized metals and metalloids pass downwardly with the gases to the lower part of the charge where they are condensed and retained owing to the filtering effect of the charge. After some time the coal contained in the upper part of the charge is nearly consumed and the volatile metals and metalloids have been collected in the lower part, then at a given moment the metal and metalloid vapors pass out with the escaping gases.

In treating ores and metallurgical products which contain several different metals, such as for instance zinc and lead, I have found that the first metal vapors which pass out with the gases only contain the zinc (partly in a metallic state, partly in form of oxid) and that it is not till the bulk of the zinc has been volatilized, that also lead vapors pass out with the escaping products of combustion. Other metals and metalloids also behave in a similar manner, as there is generally a distinct period between the moments of their volatilization. This phenomenon, which is an immediate effect of the steps characterizing the present invention, *i. e.* of the passage of air under sufficient pressure from the top surface of the charge downwardly through a comparatively thick layer of a charge contained in a furnace which is tapered toward the bottom, affords the important possibility of separating the different metals and metalloids from one another. If for example zinkiferous or leady ores or metallurgical products are to be treated, the current of gases may after the development of zinc is completed, be directed to another place, and the lead vapors carried along with the gases may be precipitated separately from the zinc. The manner of proceeding might of course be such that after the zinc development is completed, the air is turned off and the process terminated, in which case the residues (left in the furnace in the form of a sintered and agglomerated mass) still contain the lead and may be treated in a blast or other furnace for extracting the lead.

Easily volatilized metals and metalloids, such as arsenic, antimony, mercury, contained in the ores and metallurgical products to be treated, will escape before the zinc is volatilized and therefore may also be recovered separately, if desired.

In carrying out the process just described, I have found that a certain percentage of water or other vaporizing liquid in the charge is of advantage; the water having the effect of extending the preliminary period during which the charge is gradually brought to the temperature at which the volatilization of the metals and metalloids begins. This prolonged duration of the heating period causes a more uniform distribution of the volatilization temperature over the mass of the charge so that the volatilization period occurs more suddenly and is of shorter duration. This promotes not only a better extraction of the volatile metals and metalloids, but also allows of a sharper separation of the various metals and metalloids. Moreover, the favorable effect of the addition of water may be ascribed to chemical changes.

Having now particularly described and ascertained the nature of my said invention and in what manner the same is to be performed, I declare that what I claim is:

1. The process of volatilizing zinc or other metals or metalloids from ores or other materials, which consists in forming a comparatively thick body of the ore or other material mixed with a sufficient quantity of fuel to supply upon combustion the heat required for the volatilization, igniting the body at the top and maintaining combustion by a downwardly directed current of air, which, with the resulting products of combustion is passed with substantially uniform distribution through the underlying portions of the body, thereby preheating said underlying portions and condensing metallic constituents volatilized from the upper portions of the body, and continuing the flow of air and a uniform progression of the combustion until one or more of the desired metallic constituents are finally volatilized and removed with the gases partly or wholly as oxid from the bottom of the body during substantially restricted time periods of the operation corresponding to the volatilization temperature of the said constituents; substantially as described.

2. The process of volatilizing zinc or other metals or metalloids from ores or other materials, which consists in forming a comparatively thick body of the ore or other material mixed with a sufficient quantity of fuel to supply upon combustion the heat required for volatilization, said body being tapered toward the bottom, igniting the body at the top and maintaining combustion by a downwardly directed current of air, which, with the resulting products of combustion is passed with substantially uniform distribution through the underlying portions of the body, thereby preheating said underlying portions and condensing metallic constituents volatilized from the upper portions of the body, and continuing the flow of air and the uniform progression of the combustion until one or more of the desired metallic constituents are finally volatilized and removed with the gases partly or wholly as oxid from the bottom of the body during substantially restricted time periods of the operation corresponding to the volatilization temperatures of the said constituents; substantially as described.

3. The process of volatilizing zinc and other metals or metalloids from ores or other materials, which consists in forming a comparatively thick, moistened body of the ore or other material mixed with a sufficient quantity of fuel to supply upon combustion the heat required for the volatilization, igniting the body at the top and maintaining combustion by a downwardly directed current of air, which, with the resulting products of combustion is passed with substantially uniform distribution through the underlying portions of the body, thereby preheating said underlying portions and condensing metallic constituents volatilized from the upper portions of the body, and continuing the flow of air and the uniform progression of the combustion until one or more of the desired metallic constituents are finally volatilized and removed with the gases partly or wholly as oxid from the bottom of the body during substantially restricted time periods of the operation corresponding to the volatilization temperatures of the said constituents; substantially as described.

In testimony whereof I affix my signature in presence of two witnesses.

WILHELM TROELLER.

Witnesses:
 JEAN GRUND,
 CARL GRUND.